(12) United States Patent
Syed

(10) Patent No.: US 6,845,230 B2
(45) Date of Patent: Jan. 18, 2005

(54) SYSTEM AND METHOD FOR A PUSH-PULL GATEWAY-DIRECTED DIGITAL RECEIVER

(75) Inventor: Majid Syed, Princeton, NJ (US)

(73) Assignee: Ibiquity Digital Corporation, Warren, NJ (US)

( * ) Notice: Subject to any disclaimer, the term of this patent is extended or adjusted under 35 U.S.C. 154(b) by 200 days.

(21) Appl. No.: 10/033,420

(22) Filed: Oct. 26, 2001

(65) Prior Publication Data

US 2003/0092376 A1 May 15, 2003

(51) Int. Cl.[7] .............................. H04H 1/00; H04H 7/00
(52) U.S. Cl. ...................... 455/3.02; 455/3.06; 375/316
(58) Field of Search .................................. 375/216, 219; 455/3.06; 370/310, 486; 709/201; 725/63; 386/46

(56) References Cited

U.S. PATENT DOCUMENTS

| | | | |
|---|---|---|---|
| 5,852,630 A | * 12/1998 | Langberg et al. | 375/219 |
| 5,862,325 A | * 1/1999 | Reed et al. | 709/201 |
| 6,128,334 A | * 10/2000 | Dapper et al. | 375/216 |
| 6,246,698 B1 | 6/2001 | Kumar | |
| 6,526,580 B2 | * 2/2003 | Shimomura et al. | 725/63 |

* cited by examiner

Primary Examiner—Stephen Chin
Assistant Examiner—Curtis Odom
(74) Attorney, Agent, or Firm—Blaney Harper Jones Day

(57) ABSTRACT

A receiver is described for receiving digital data broadcasts from a Push-Pull gateway. The receiver is equipped with a demodulator, deinterleaver and turbo broadcast decoder for parsing and rendering the received broadcast data. Additionally, the receiver is also equipped with a GPS module and an uplink module for communicating with the Push-Pull gateway or a content provider center. The GPS module can also be used to assist in filtering broadcast data specific to the receiver's location. The uplink module is used to transmit profile information defining the client's desired broadcast format. The uplink module is also used to dynamically update private keys that are provided to clients for authentication and decoding purposes. The uplink together with the turbo broadcast layer module is also used for "buy" activities.

26 Claims, 11 Drawing Sheets

| | ENTITY | INTERFACE REFERENCE | PHYSICAL INTERFACE | NETWORK INTERFACE |
|---|---|---|---|---|
| 102 | ASP - iPPG | N (NETWORK) | POTS/ISP (DEFAULT) | TCP/IP (DEFAULT) |
| 106 | iPPG - EXCITER | E (EXCITER) | 1) STL (DEFAULT) 2) POTS 3) OTHER LOOP ACCESS WIRELESS, LMDS, SATELLITE | PPP OR SLIP |
| 112 | iPPG - LOG (CDR) | B (BILLING) | ETHERNET | RESIDENT AT STATION OR RESIDENT AT REMOTE |
| 105 | iPPG - DATA SERVER | D | POTS (DEFAULT) | 1) PPP - DEFAULT 2) TCP/IP |
| 110 | iPPG - OAM | O (OAM) | ETHERNET | SNMP - MIBx DEFAULT |
| 108 | EXCITER - RECEIVER | I | iDAB | NA |
| 113 | RECEIVER - TBL | R (RECEIVER) | PROPRIETARY | NA |
| 114 | TBL - TERMINAL | T (TERMINAL) | ONE-ON-ONE | CUSTOM API |
| 115 | ASP - LOCAL | L | OFF LINE: R/W FLOPPY/CDS ON LINE: POTS | TCP/IP DEFAULT OTHERS: PPP, SLIP etc. |

TABLE 1

FIG. 2

SYSTEM AND METHOD FOR A PUSH-PULL GATEWAY-DIRECTED DIGITAL RECEIVER

RELATED APPLICATIONS

This application is related to commonly assigned and co-pending application entitled "System and Method Providing a Push Gateway Between Consumer Devices and Remote Content Provider Centers".

FIELD OF INVENTION

The present invention relates generally to the field of digital broadcasting. More specifically, the present invention is related to systems and methods for operating a digital receiver in a Push-Pull gateway directed digital transmission architecture, over a digital audio broadcast (DAB).

BACKGROUND OF THE INVENTION

Definitions have been provided to help with a general understanding of network transmissions and are not meant to limit their interpretation or use thereof. Thus, one skilled in the art may substitute other known definitions or equivalents without departing from the scope of the present invention.

Simplex Communication: Refers to transmission in only one direction. Thus, simplex refers to one-way communications where one party is the transmitter and the other party is the receiver. An example of simplex communications is a simple radio, wherein users are able to receive data from stations but are unable to transmit data.

Datagram: A portion of a message transmitted over a packet-switching network. One key feature of a packet is that it contains the destination address in addition to the data. In IP networks, packets are often called datagrams.

Push: Push refers to sending data to a client. The World Wide Web (WWW) is based on a Pull technology where the client browser must request a Web page before it is sent (pushed). Broadcast media, on the other hand, utilize Push technologies because information is sent (pushed) out regardless of whether anyone is tuned in.

Increasingly, companies are using the Internet to deliver information Push-style. The most widely used Push technology is e-mail. This is a Push technology because one receives mail whether they ask for it or not; that is, the sender pushes the message to the receiver.

Pull: Pull refers to requesting data from another program or computer. The opposite of Pull is Push, where data is sent without a request being made. The terms Push and Pull are used frequently to describe data sent over the Internet. As mentioned earlier, the WWW is based on Pull technologies, where a page isn't delivered until a client requests it. Increasingly, however, information services are harnessing the Internet to broadcast information using Push technologies. A prime example is the PointCast Network™.

Presently, receivers for radio transmissions generally operate using analog VHF transmission. Digital audio broadcast (DAB) provides a method and system for the simplex (one-way) transmission and reception of high-quality audio (music and/or speech) and ancillary digital data content by radio frequency (RF) signals. The RF signals are generated in and broadcast from a transmitter system, and received by any of multiple receiver systems, which may be a consumer electronics device (such as a car radio receiver). Typically, the transmitters are satellites or land-based, or a combination of space and terrestrial equipment. In general, terrestrial transmission is required for adequate mobile receiver performance in areas with dense natural and/or man-made structures, because satellite reception typically requires line-of-sight (LOS) propagation due to large propagation path signal losses.

As with any digital RF signal, the RF signal for DAB represents digital (bit) information that is encoded in the signal generated in the transmitter system by a modulation method. Unlike conventional analog FM modulation, the information represented by the digital signal (e.g., digitized speech, music, and/or data) is typically unrelated to the characteristics of the transmitted signal. A primary goal of DAB is to eventually supplant the existing commercial analog radio broadcast network (i.e., AM-band and FM-band). Since the primary function of the existing AM-band and FM-band is to provide audio services in the form of music and/or speech, it is presumed that a significant fraction of the encoded digital data represents one or a plurality of digital audio signals.

In many circumstances, the quality of the digital audio signal recovered in the DAB RF signal receiver can be expected to be of higher quality than the audio signal recovered from the conventional analog frequency-modulated (FM) signal. Typically, the digital audio signal has a higher signal-to-noise ratio (SNR), a larger audio bandwidth, and improved stereo separation (i.e., spatial fidelity) when compared to conventional FM-band reception. For example, conventional analog FM-broadcast signals have a recovered audio bandwidth of about 15 kHz. While 15 kHz audio bandwidth is substantially greater than the audio bandwidth received for commercial AM-band radio broadcast (i.e., 535 kHz–1705 kHz, which is typically less than 10 kHz), 15 kHz is still less than the bandwidth of pre-recorded music on the compact-disc (CD) format, which is about 20 kHz).

The improved audio bandwidth advantage of DAB when compared to conventional analog FM-band reception is generally desirable. However, the most significant advantage of a DAB signal when compared to an analog FM-band signal is its greater immunity to various forms of distortion and interference at the DAB receiver. Distortion and interference in the recovery of an analog FM-band signal causes various undesirable artifacts in the audio signal at the receiver. Examples include static noise, hiss and hum, and clicks. In certain circumstances, background noise limits the quality of the recovered signal. Background noise may be generated by galactic, atmospheric, thermal, and man-made sources, as in the example of an automobile engine-generating interference in a car radio.

Background noise is particularly noticeable in a received analog FM-band signal when there are pauses or quiet passages in the transmitted audio program. The process of analog FM modulation typically improves the robustness of the recovered signal when compared to other analog modulation methods such as amplitude modulation as used in the AM broadcast band. This improvement results from frequency modulation increasing the occupied bandwidth of the signal, thereby causing "processing gain". However, the benefits of the analog FM processing gain are substantially eliminated when the source audio signal is silent or quiet.

Background noise is typically distinguished from distortion, which has two primary sources. The first source of signal distortion is related to the propagation characteristics of the RF signal. A common example is multipath distortion, where the effects of reflection, refraction, and attenuation can cause a single transmitted signal to travel to a receiver along several different paths. The signals from separate paths naturally have different characteristics which may interfere with each other. The deleterious effects of multipath are a result of the relatively high RF carrier frequencies, which are characteristic of FM-band frequency range, and the use of omnidirectional receiving antennas, especially for radio receivers in vehicles. Multipath propagation results from the presence of specular and/or diffuse reflectors in or about the propagation path between the transmitter and the receiver. As a result, multiple signals with varying delay, phase, amplitude, and frequency are received, these signals corresponding to different propagation paths. In general, the deleterious effects of multipath are attenuation of the RF signal due to destructive coherent interference between paths, dispersion in the received RF signal due to frequency selective characteristic of multipath, and intersymbol interference between adjacent signal baud intervals. Multipath is typically mathematically modeled as a deterministic linear sum or stochastic function of the transmitted signal and reflections, with background noise modeled independently in the summation.

The second common source of signal distortion is interference caused by the presence of other RF signal sources with similar frequencies, including FM-band transmitters. In circumstances when there are many transmitters, for example, in large urban areas, inter-station interference due to other transmitters operating at the same or similar RF frequencies may be the primary cause of signal degradation, except for weak-signal conditions at substantial distances from the transmitter or unusual reception circumstances (e.g., signal shielding in a tunnel).

Because broadcast transmitters may emit high-power RF signals, their operation is often dictated by government agency-enacted rules and regulations that are intended to prevent interference between stations. However, there are sometimes specific exceptions granted that permit transmitters to avoid strict adherence to these rules. Furthermore, the presence of noise and multipath distortion may cause reception conditions that are substantially degraded when compared to the nominal conditions that are presumed to exist according to the rules. In the United States, the Federal Communications Commission (FCC) determines the rules and regulations governing FM-band broadcast.

The general goals of a DAB system are independent of the specific implementation of the DAB system. The commonly intended purpose of DAB is to provide a simplex communication system, which conveys digital audio and ancillary data in the form of RF signals from one or a plurality of transmitters to one or a plurality of receivers. It is desirable that the determination (i.e., demodulation and decoding) of the transmitted DAB signal at the receiver is less degraded by the effects of noise, multipath, and interference compared to the reception of conventional FM-band broadcast signals for DAB and FM signals with equivalent coverage. The quality of the recovered digital audio signal represented by the DAB RF signal when unimpaired is typically equal or nearly as high as pre-recorded CDs. However, the direct digital transmission of data in the CD format is inefficient because of the high data rate that is required for faithful CD representation, which is greater than one million bits per second for stereo signals. In a DAB system, the audio—speech and/or music—is source compressed, thereby reducing the required data throughput substantially. Source compression accomplishes a reduction in the required bit rate for audio information which is at or below a threshold of perception and whose absence will not typically be noticed by the listener.

In a conventional DAB system, the data representing the compressed audio signal is combined with ancillary data and then error-correction encoded, modulated, and emitted as an RF signal at the DAB transmitter. In the corresponding conventional DAB receiver system, the received RF signal is demodulated, error correction decoded, and the effect of the source-compression is reversed to generate a conventional digital audio signal, for example, in the form of a pulse-code modulated signal. The design and implementation of an audio compression and decompression (codec) algorithm is a complex process, but several methods which are suitable for DAB are well known in the art.

An important characteristic of DAB systems is the ancillary data capability. The ancillary data most often transmitted and/or that is desired to be transmitted in a DAB signal is typically unrelated to the digital audio signal. The ancillary data permits broadcasters to increase the range of services, which are provided to listener receivers, including services other than audio services. This characteristic of DAB systems is particularly attractive since the improvement in received audio quality over conventional FM-band reception brought about by the implementation of a DAB system alone may be insufficient to justify the costs associated with widespread conversion from conventional analog FM-band modulation to a DAB system.

Currently, analog FM-band stations may transmit limited associated data services along with analog FM signals, through analog FM subcarrier signals. The subcarrier signals are known as "SCA" signals because of their authorization by the Subsidiary Communication Authorization granted by the FCC. SCA signals are combined with the conventional FM audio signal matrix at baseband so that, unlike DAB, the SCA signals are combined with the conventional FM audio signal matrix at baseband so that, unlike DAB, the SCA signal is a component of the transmitted FM signal. A disadvantage of SCA signals is that their bit rate throughput is relatively low, typically less than 30 kbit/s. Furthermore, the SCA signal is susceptible to the effects of interference and distortion in the same manner that analog FM-band audio reception is degraded because demodulation of the SCA signal typically requires conventional analog FM modulation as the first step in recovering the SCA signal. For a specific frequency deviation, the robustness brought about by the use of FM modulation diminishes as the baseband modulating frequency is increased, as the FM processing gain for the embedded SCA signal is relatively small.

For DAB, a preferred characteristic of the ancillary data associated with the digital audio signal is that the recovered ancillary data signal is of a reasonable bit rate throughput. For example, the bit rate throughput is at least 64 kbit/sec, and at least as robust to the effects of interference and distortion as the remainder of the digital data, including the digital audio signal, in the DAB signal. While audio compression algorithms may operate correctly with decoded bit error rates as high as $1 \times 10^{-5}$ because transient errors may not be detected by the human hearing process, ancillary data may require a much lower decoded bit error rate, typically less than $1 \times 10^{-7}$. The range of services known in the prior art which may be implemented with the DAB ancillary data include traffic, weather, road conditions, and emergency information; subscriber services such as paging and specialized newscasts such as stock quotes and sports scores; low-bit rate video and still pictures; electronic-mail and Internet broadcast; satellite navigation data; and duplex communication and electronic commerce with return data-channel accomplished, for example, by cellular telephony.

A fundamental way to characterize a DAB system is by the method which is used to generate the RF signal at the transmitter and to determine the RF signal at the receiver.

There are different RF modulation and demodulation methods which may be used to implement a DAB system. One characteristic in distinguishing between methods in whether or not the proposed DAB system implementation requires a new frequency allocation other than the existing AM and FM broadcast bands. The high-power RF signal emissions for DAB will typically be regulated by government agencies in order to mitigate RF interference. Control of the frequency allocation through specific channel frequency assignments and RF emission limits (i.e., average power or power spectral density) prevents interference from other RF signals sources into the desired DAB signal and vice versa. Since the DAB receivers are expected to be a large-scale consumer electronics application, standardized frequency allocations must also be considered in order to develop economically viable receiver systems.

However, in order to improve the transmission quality, digital processes are frequently used, such as digital satellite radio (DSR). Thereby, a transmission signal is transmitted from the transmitter via a satellite to the receiver. In order not to equip every single receiver with relatively large and expensive antenna and a first low-noise mixer for the satellite radio, a DSR signal may be fed from a central terrestrial receiver, and also over broadband cable networks to the receiver.

A digital receiver is used to achieve the best possible reception quality of a digital transmission signal. Such a digital receiver is known from German Patent DE 34 28 318 A1. In this receiver, the analog reception signal is mixed down into an intermediate frequency signal by a mixer, is band-limited with an analog bandpass filter, sampled, analog-to-digital converted, and multiplied with complex signal of an oscillator in at least one digital signal processor. In this manner, the quadrature components of the reception signals are generated in the baseband.

The disadvantage in this receiver is the expensive processing of the analog-to-digital converted signal. At least one digital signal processor is required for performing a multiplication with a complex oscillator signal.

A digital demodulator for frequency-modulated signals is disclosed in European publication EP 0201758 B1, which enables compensation of multipath reception. In this demodulator, the reception signal is first mixed down into an intermediate frequency signal, band-limited and analog-to-digital converted. Thereafter, the digital signal is fed to a cascading equalizer, which performs a reduction of the reflections contained in the input signal.

This demodulator is disadvantageous in that it requires a complex circuit and corresponding engineering effort, particularly in view of the cascading equalizers.

A circuit is disclosed in the IEEE publication Aerospace and Electronic Systems, Vol. 20, No. 6, November 1984, pages 821–824, entitled, "A Simple Method of Sampling In-Phase and Quadrature Components", which mixes down the reception signal, band limits the same, samples and performs analog-to-digital conversion. The digital signal is downsampled and fed to two parallel switched all-pass filters, of which the one emits the real signals component and the other the imaginary signal component of the input signal.

This circuit is disadvantageous due to its very high sampling rate, which requires a high processing speed in the analog-to-digital converter. Furthermore, the two fifth order all-pass filters require a complex switch.

The prior art DAB systems described above fail to provide for a means for digital content providers to send targeted data to specific receivers based on information gathered at the transmission site. This function can be accomplished using a Push-Pull gateway architecture in conjunction with the present invention. The current inability of DAB content providers to target the delivery of data differs from the present invention. The present invention includes the ability to enable content providers to "Push" their digital data to specifically targeted receivers.

SUMMARY OF THE INVENTION

The present invention provides for a receiver for the reception of digital broadcast signals. The broadcast signals are transmitted from a Push-Pull gateway via a network such as an in-band on-channel (IBOC) network. The receiver of the present invention is equipped with a demodulator, a deinterleaver, and a broadcast layer decoder for parsing and rendering the received broadcast data. Moreover, each client utilizing the receiver is provided with one or more private keys that are used to decode the broadcast signals. Additionally, the receiver is also equipped with a GPS module and an uplink module for communicating with a Push-Pull gateway (hereafter iPPG or iGateway) or a content provider center such as the one fully described in a co-pending application entitled, "System and Method Providing a Push Gateway Between Consumer Devices and Remote Content Provider Centers".

In one embodiment, the receiver's classification is uploaded to the iPPG by the OEM. Profiles are used by the Push-Pull gateway to broadcast data in specific format as defined in the profile. Additionally, updated profiles are used to dynamically update the private keys associated with clients.

In yet another embodiment, the receiver is provided with two ports for receiving broadcast data, one being a secure port and the other a non-secure port. These ports are activated based upon the type of received broadcast transmission.

Furthermore, the receiver of the present invention is equipped with an error-handling mechanism. For example, if a common part indicator field in encoder is not valid, then any information in the reassemble buffer is discarded.

The receiver of the present invention is classified into many classes, e.g., class A, class B, and class C, etc. Class A comprises receivers with multimedia (audio and data) receiving capabilities; class B comprises receivers capable of receiving data transmissions; and class C comprises receivers capable of receiving audio transmissions. Similarly, each class may be equipped with a GPS module and an uplink module.

BRIEF DESCRIPTION OF THE DRAWINGS

FIG. 2 illustrates a table outlining a brief description of the various elements that make up the system in FIG. 1, and the interfaces associated with these elements.

DESCRIPTION OF THE PREFERRED EMBODIMENTS

Figure 1:
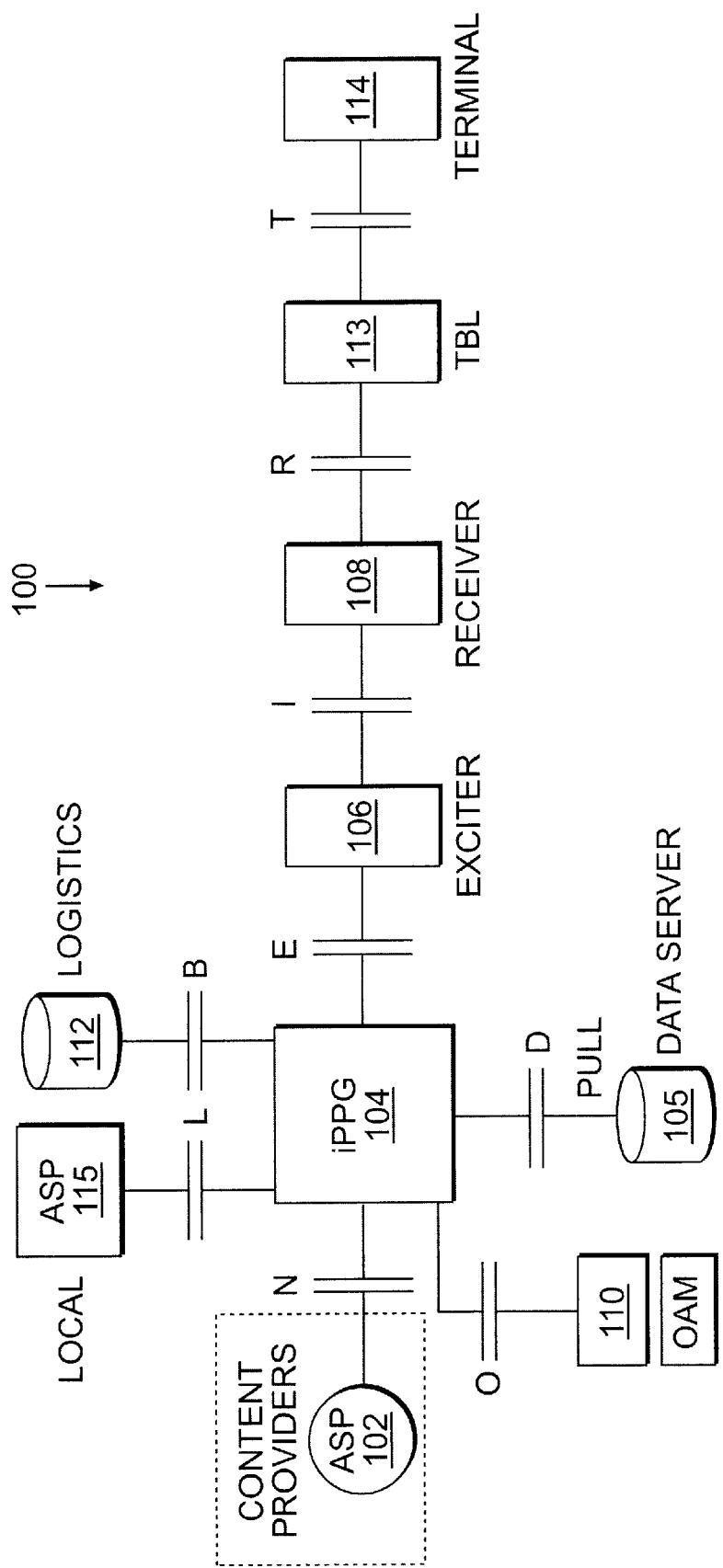
FIG. 1 illustrates the Push-Pull gateway (iPPG or iGateway) End-to-End (E2E) system.

While this invention is illustrated and described in a preferred embodiment, the invention may be produced in many different configurations, forms, and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

FIG. 1 illustrates the Push-Pull Gateway (hereafter iPPG or iGateway) End-2-End (E2E) system 100 used in conjunction with the present invention. The system components (to be described below) of the iPPG collectively achieve the Push, Pull, and send features of the present invention's gateway (iPPG). In FIG. 1, the remote application service providers (ASPs) 102 submit (or Push) content, over a network N (e.g., PSTN) via a protocol (such as HTTP over the Internet), to the iGateway 104. Optionally, a local ASP 115 can also be accessed via a local ASP interface L. The iGateway 104 is able to either accept or reject such requests by ASPs 102 and ASP 115. The iGateway is also able to retrieve (or Pull) content 105 (from data server) as selected by station operator. The iPPG of the present invention, with the help of an operation administration module (OAM) 110, prioritizes, schedules, and sends datagrams (over interface E) to the iExciter 106. Receiver 108 acquires the data and a link layer 113 de-encapsulates the data. The data is then displayed on terminal 114. Furthermore, a billing procedure keeps track of all data pushes (via pre-defined logistics 112) from various ASPs for billing purposes. As will be detailed later, when in listen mode, the data receiver 108 displays the received data continuously, or, upon demand, as per filtration activated by a subscriber. A brief description of the various elements that make up the system in FIG. 1 and the interfaces associated with these elements are described in further detail in Table 1 as shown in FIG. 2.

Figure 3:
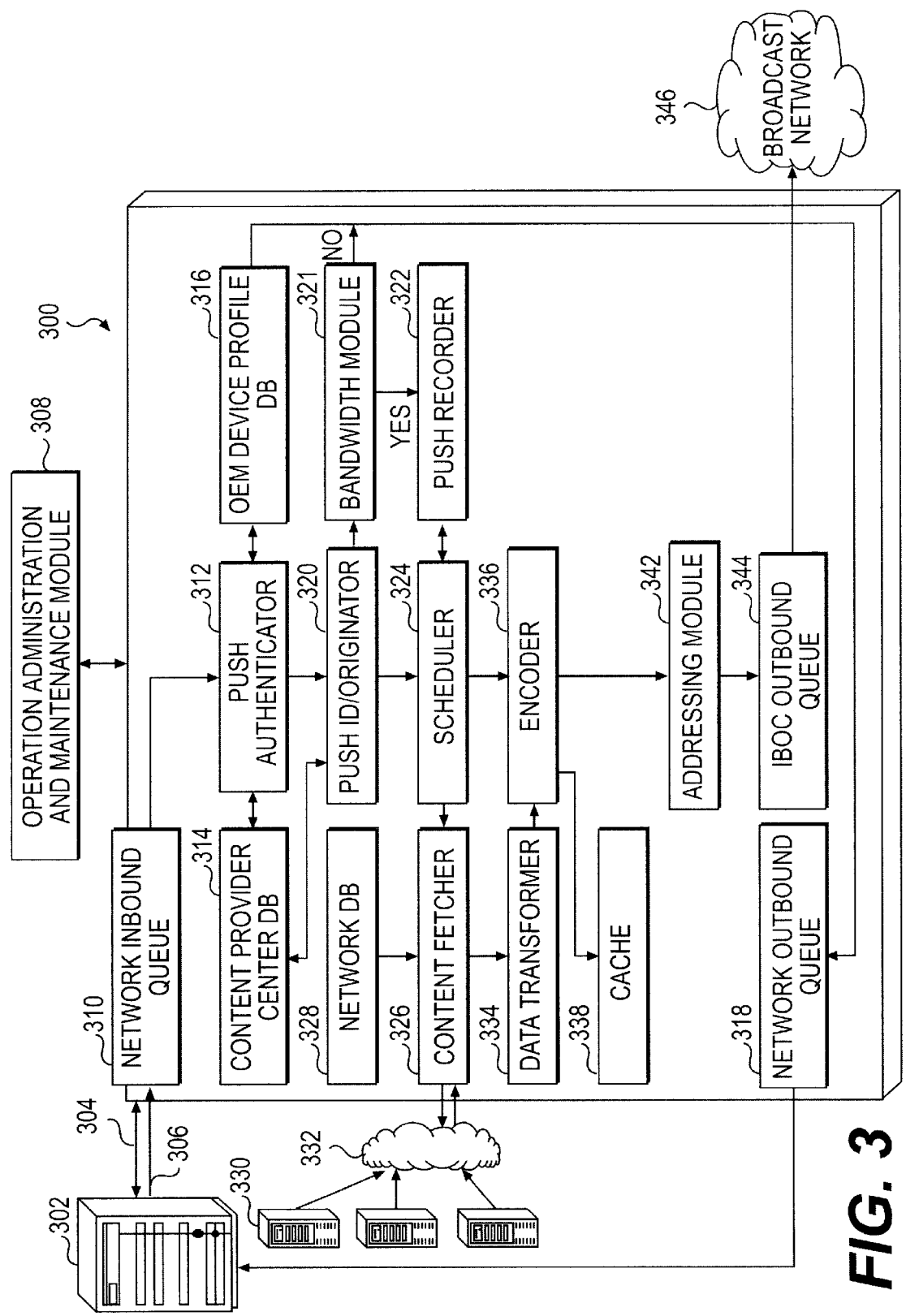
FIG. 3 illustrates, in greater detail, the functionality of the Push-Pull gateway.

FIG. 3 illustrates, in greater detail, the functionality of iPPG 300 of the present invention. The content provider center 302 establishes session 304 with iPPG 300.

The ASPs are able to execute Push requests 306. The established session provides for a (data link such as a link based upon a standard peer-2-peer protocol or any other data communication link). Furthermore, as shown in FIG. 3, an operation Administration and Maintenance Module (OAM) 308 controls, in an event driven manner, the iPPG 300 of the present invention. Content provider center 302 is able to submit a Push request to the iPPG 300, where it is first received by the network inbound queue 310. Next, Push authenticator 312 identifies and authenticates content provider center 302 as the Push initiator. This authentication is performed based upon information stored in content provider center database 314. Furthermore, the Push authenticator 312 checks if the Push message contains any client device capabilities queries (a query requesting client's device supported format (e.g., Text, HTML, WML, etc.), and if so, the queries are passed onto OEM device profile database 316, wherein the device profiles of queried clients device are extracted and passed on to the network outbound queue 318 for transmission to the content provider center 302. On the other hand, if the Push message is made up of just data content to be pushed (or a request for data content to be pushed), Push ID/originator ID numbers 320 are extracted from the content provider center database 314 and passed onto the Push recorder 322 for storage.

In a real-time scheduling scenario, the iGateway is always aware of the over the air bandwidth availability for a defined calendar. This information is kept in bandwidth module 321. When iGateway is accessed, the ASP is informed regarding the availability of slots and their associated cost. Furthermore, upon some dialogue interaction, the iGateway is able to accept or reject the content to be transmitted over the air. If bandwidth is not available, the message is placed in 318, or else it is moved to Push recorder 322.

A scheduler 324, then parses control entity of the message and determines time/schedule for contained instructions and passes such information for storage on to Push recorder 322. If the instruction extracted by the scheduler 324 includes retrieving data, the content fetcher 326, in conjunction with the scheduler 324 and a network database 328, Pulls data from content providers 330 via a network 332, such as the Internet. The Pulled data is then transformed and encoded (via data transformer 334 and encoder 336, respectively) into a format supported by the consumer device (client). Furthermore, data transformer 334 and encoder 336 split the data into octet data blocks, assign serial numbers to all packets, and pass them on to addressing module 342 and cache 338. Lastly, the data from the addressing module is then passed onto the IBOC outbound queue 344 to various end devices linked to a broadcast network 346 such as an IBOC network.

Figure 4:
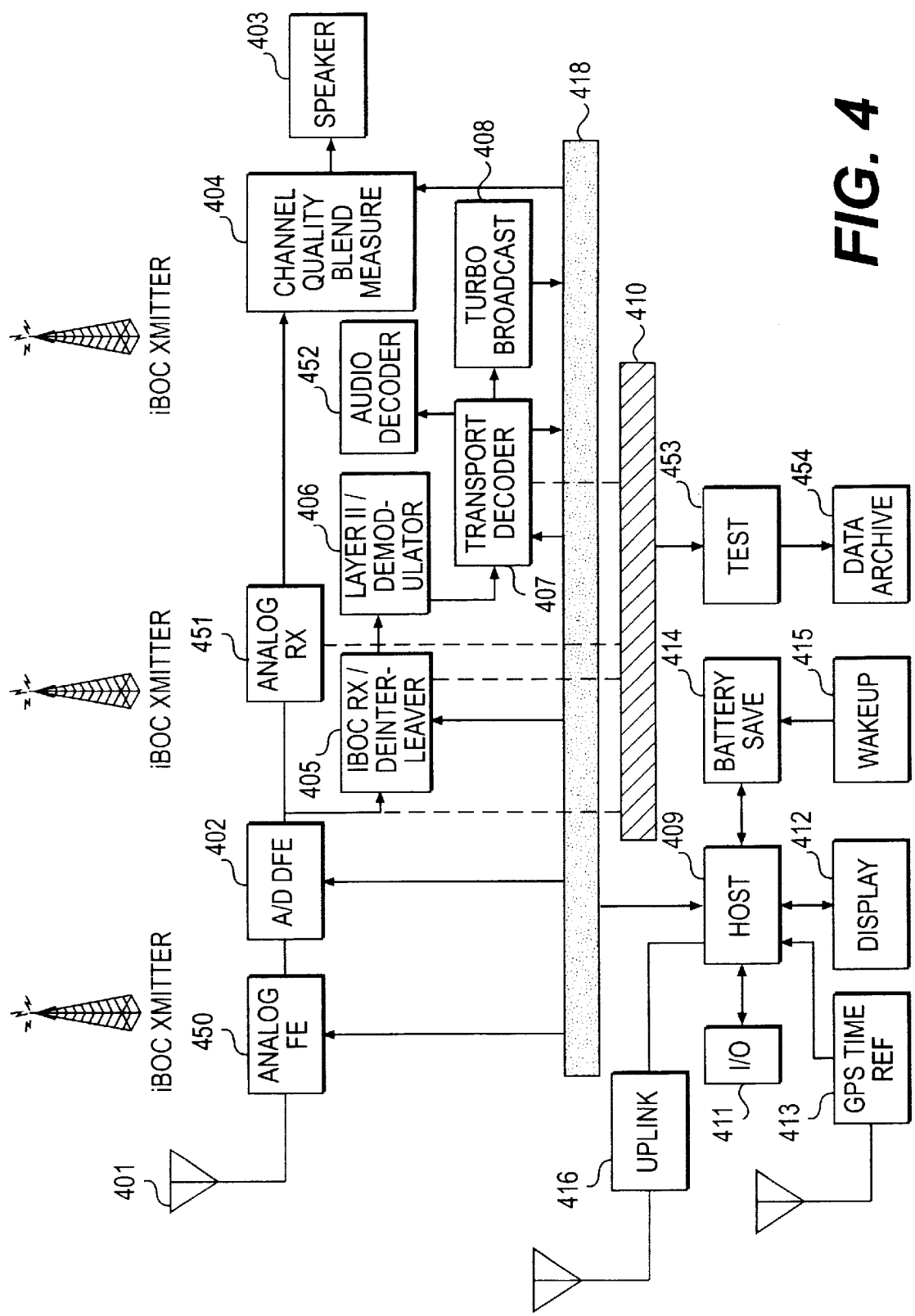
FIG. 4 illustrates how incoming data is handled by the receiver (an IBOC-enabled consumer device) of the present invention.

FIG. 4 illustrates how incoming data is handled by a consumer electronics receiver (an IBOC-enabled mobile device 400 such as a digital car radio) of the present invention. An antenna 401 located on the receiver first receives incoming data, and detection equipment 402 detects such data and optionally amplifies the signal. Additionally, the detection equipment 402 uses a channel quality measurer 404 to calculate the quality associated with the tuned channel. The received data is then deinterleaved, via deinterleaver 405, demodulated via demodulator 406, decoded via a decoder 407 (such as a transport layer decoder). The audio part goes to audio decoder and later to speaker 403, and the data part goes to broadcast link layer decoder 408. It should be noted that the processing unit 409 actively controls the above-described deinterleaver, demodulator, decoder, and link layer decoder. Lastly, the processing unit and memory 410 process the decoded data before being presented to the end user device, via a display device 412 providing filtration, or as is through input 411. A GPS system 413 is also included for receiving coordinate-related information to be used later by the receiver for content filtration based upon current location. Additionally, the receiver also has a battery save module 414 that, when activated, saves battery energy by deactivating the receiver when scheduled transmission is not of interest to the listener. A wakeup function 415 is provided for activating the receiver when scheduled transmissions are of interest to the receiver (listener). The assumption is content filteration is initialized via input 411. In addition, an uplink module 416 is also provided for uploading profile related information to the iPPG via an existing wireless network; the uplink module is also used to activate "buy" when the MMI, triggered by input 411, is initiated by the listener.

Additionally, the receiver is equipped with one or more private keys that are used to decode the received broadcast data (multimedia, audio, and other data content). The uplink module is used to update profiles that are stored in the iPPG, and based on these updates, the private keys are dynamically updated.

The iPPG interacts with the receiver of the present invention in various ways, some of which are described below. The iPPG identifies the party initiating a Push request and performs an authentication procedure on the initiator. Furthermore, the iPPG receives information from the ASPs and forwards the content to end devices on a broadcast network such as the IBOC network. Additionally, upon receiving a Push request from an ASP, the iPPG presents its available bandwidth slots (for different times of the day) to the ASP. Furthermore, the iPPG also indicates to the ASP when a desired scheduling rate is not available and may present to ASP what is available. The iPPG also processes the ASP messages for errors/completion and parses the message for the following requests: query, cancel, replace, and confirm. Moreover, the iPPG also provides an acknowledgement of successful delivery of content to the ASP. This message is transmitted from the iPPG to the Push initiator. The iPPG includes a storage means for storing advertisements. Additionally, as mentioned earlier, the iPPG also prioritizes content for transmission.

The iPPG also performs scheduling operations. The iPPG scheduler makes intelligent decisions as to when and how much is to be transmitted over the air. Furthermore, the iPPG generates and transmits schedule messages indicating the intended schedule of transmissions. The schedule message is helpful in minimizing the battery power in the IBOC enabled data receiver (such as iBiquity's digital receiver or iDR™) as it allows the iDR to ignore transmissions of messages the listener is not interested in.

Moreover, the iPPG also maintains a log of broadcast detail records from the iExciter to the iPPG. The iPPG also supports 7 and 8 bit data coding schemes for over-the-air (OTA) efficiency (local function in iPPG). To improve OTA efficiency, a numeric identifier is used instead of a URI. In this case, a broadcast interim authority assigns numbers to well-known user agents to avoid the overhead of sending a URI. The broadcast interim authority publishes a list of assigned numerical identifiers. If an iPPG requests to Push content with an application address URI that the iPPG recognizes as a URI that has broadcast interim authority assigned numeric identifier, the URI is replaced with the numeric identifier. Additionally, the Push initiator can also request a numeric identifier to be used (an identifier that is not registered). It should, however, be noted that special care should be taken to avoid assigning similar identifiers by multiple ASPs. The iPPG is also involved in reliability, rate at which broadcast of message should be repeated, time at which a message should commence broadcasting, determining pre-download with the deactivate flag enabled, and determining when to activate the deactivate flag.

Furthermore, the iPPG initiates transmission by sending fixed length short messages to iExciter, and when necessary, pads the message with appropriate characters to a length sufficient to fit in the transport layer. It further maintains flow control when received load indication messages indicate an underflow or overflow situation in the iExciter. Additionally, the iPPG is able to route the content to selective iPPG (when more than one iPPG exists and are networked). In this instance, a centralized gateway: performs intelligent scheduling such that the same information is not repeated by each transmitter, keeps track of available bandwidth, and instructs receivers to look around for other information. Additionally, iPPG determines the neighboring radio station channel (look around) on which the message should be broadcast provided local stations are networked.

The iPPG also determines the time at which a message should cease being broadcast, and subsequently instructs each iExciter to cease broadcast of the message. It also determines the set of geographic zones as indicated by ASP (if networked).

The iPPG provides the Push initiator with client device capability lookup services, letting a Push initiator select the optimal flavor of a particular content for a particular client device. A Push initiator is able to query the iPPG for client device capabilities and preferences, to create better-formatted content for a particular IBOC device. This feature is dependent upon broadcasters who have to maintain registered device profiles. Additionally, broadcasters need to keep track of various receiver classes and if they are registered in its domain. It should be noted that this can be used in specialized services, such as paging.

An FCC identifier field identifies a defined zone covered by iExciter. Thus, the iPPG may Pull the deterministic information from the FCC database and uses this information for address and geographic contour verification purposes. The zone field identifies the iExciter to which the message applies. The footprint list contains at least one iExciter. The billing management layer or OAM layer uses this information for later use. This parameter contains a list indicating the number of times the message has been sent to each iExciter and if iExciter has completed OTA transmission. It should be noted that the number-of-broadcasts-completed can be set to zero if there were no broadcast messages sent.

The service specific adaptation layer (SSAL) receives service data units by means of standard service access points (SAP). It should be noted that the SSAL is accommodated in the iGateway. Furthermore, the SSAL performs the quality of service (QoS) functions required by the service specific applications such as delay, loss sensitivity, jitter, differential broadcast services as defined by the operator, etc. Additionally, SSAL operates via two modes of SSAL services: message mode and a streaming mode.

In the message mode, the service specific adaptation layer-service data unit (SSAL-SDU) is passed across the medium adaptation control (hereafter iMAC) in exactly one service specific adaptation layer-interface data unit (SSAL-IDU). This service provides the transport of a single SSAL-SDU in one segment. Generally, this mode is used for operation administration and maintenance (OAM) signaling (Common Part Indicator—CPI).

In the streaming mode, the SSAL-SDU is passed across the fragmentation interface in one or more SSAL-IDUs. The transfer of this SSAL-IDUs across the iMAC interface occurs separated in time (this is to accommodate QoS related issues and is handled by the bandwidth (BW) scheduler). An internal pipelining function in the (receiver) SSAL is applied for providing the means by which the sent SSAL entity initiates transfer to receiving SSAL entity before it has a completed SSAL-SDU available.

Now, a description of content scheduling is given. In broadcasting, prime time is the most appealing time slot for broadcasters and advertisers. But, due to the limited bandwidth, every over the air request at prime time cannot be handled. In a non real-time scheduling scenario, the iGateway handles this transmission of content as follows. The iGateway transmits the content in advance with Deactivate Flag enabled. Thus, at prime time, the iPPG sends a command to activate the flag. The receiver now proceeds to process the contents. The iPPG may re-schedule the same at prime time if allowed by bandwidth scheduler. This is to assist the turned off receiver, which did not capture during previous predownload.

Additionally, the iGateway allows other programs, such as bulletin boards, to kick off auto download. For example, using a transfer protocol, such as file transfer protocol (FTP), the iGateway polls information sites such as weather, traffic, stocks, games at pre-defined time periods and broadcasts extracted formatted information to the end devices.

Furthermore, schedule messages are generated indicating the intended schedule of transmissions. It should be noted that such schedule messages are helpful in minimizing battery in the iDR, because it allows the iDR to ignore transmissions of messages the subscriber is not interested in. Additionally, specific channels for broadcasting the content can be selected for over the air transmission.

Additionally, the iPPG is able to copy selective, random or all pushed and pulled content in a separate buffer called the passive queue. Thus, when content is served from the active queue, the scheduler transmits from the passive queue. Furthermore, the over the air transmission packets are tagged identifying that the content is from the passive queue. In the preferred embodiment, the receiver maintains a passive queue. Thus, the receiver, when composing messages, ensures completeness by retrieving packets from the passive queue.

A pseudo algorithm is also available for bandwidth management, called fair queuing. The application kernel looks at the appropriate header bits (e.g., QoS grade indicators in control part of the ASP header) to determine advert content characteristics. It then routes (or pre-loads) the information to one of the fair queues (FQ). Fair queuing is used to prioritize flows per QoS service grade requested by ASP attribute and, at the same time, keeps resource starvation at its minimum. It should be noted that if an FQ flow does not use its assigned bandwidth, other flows are able to use it. Furthermore, each FQ has sub-queues and packets are scheduled so that each flow receives a constant fraction of the IBOC link bandwidth (especially during prime time congestion period).

It should be noted that the iPPG is able to communicate with any well-known access networks via protocols such as PPP, TCP/IP, Frame Relay, Enhanced General Packet Radio Service (EGPRS), Sirius®, WAP, MediaPlex®, WML, XML, BlueKite®, or other known or future protocols.

Furthermore, the iPPG can be networked with other iPPGs to route the ASP messages to the appropriate iPPG. Additionally, the iPPG determines the geographical scope of each message and communicates with the respective iPPGs. The iPPG further determines the time at which a message should cease being transmitted over the air. This information is conveyed in the network part of the Turbo Broadcast Layer.

It should further be noted that local radio stations are able to merge their available data bandwidth so that each broadcaster does not need to transmit the same information. Instead, unused bandwidth is used for other data content. Additionally, if broadcast schedule data is broadcast at a pre-determined time, then receivers that are noise affected with one contour pick up the content from another transmission. This scheme helps assure that the receiver receives information that is healthy because it can compare the information transmitted by another transmission. The use of this scheme requires synchronized scheduling.

Furthermore, bulk downloads such as e-newspaper, e-books, software upgrades, etc., are performed during non-traffic hours such as midnight. Confirmations regarding software downloads/upgrades are accomplished via an uplink. Should a particular receiver fail to compose the download, the receiver sends an uplink request regarding missing records. Additionally, the iPPG gathers statistics to decide if there is a need to rebroadcast some segments of the transmission or to individually send the missing records to each receiver.

Turbo Broadcast Layer

Figure 5A:
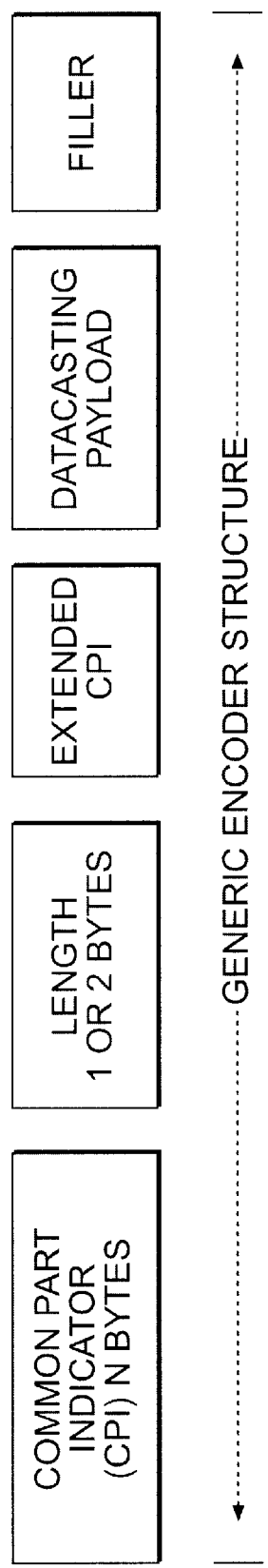
FIGS. 5a and 5b collectively illustrate a Turbo Broadcast Generic Encoder Header (at receiver) and the various layers associated with the protocol used in conjunction with the receiver of the present invention.

Turbo Broadcast layer is responsible for transport of datagrams from iPPG to the iBOC data receiver and its user agents. Turbo broadcast layer provides the following services:

iSSAL iBOC Service Specific Adaptation Layer iMAC iBOC Medium Adaptation Control FIG. 5a illustrates a Generic Encoder Header for Turbo Broadcast Layer.

1.1 Common Part Indicator Structure 1.1.1 Protocol Discriminator

One bit field to indicate if protocol is proprietary defined (such as iBiquity protocol™) or private. If private, it may block for over the air (OTA) transmissions.

To block or tunnel with private encoding of third party.

1.1.2 Scope

For differentiated services for Point-2-Group and Point-2-Point. If enabled, extended bit indicator will be set. The extended header will be of varying length to indicate information as necessary e.g., Point-2-Group cast address, key management in case of paid subscription, etc.

1.1.3 Service Grade

Sixteen grades of services with respect to coverage and quality of the radio station. For example, MPS-Data, Service grade is initialized for main primary 1, which means that on the average, coverage and quality is as defined in iBOC specification.

1.1.4 Continue/End

This field to specify if more than one service IE are present in a given turbo broadcast encoder structure. ASP may use this field to fill up the unfilled bytes of MP-Data bandwidth with some other data, e.g., weather.

1.1.5 Extended

This field can be used for future expansion. The header row can also be of variable length, e.g., If scope=P2G, then extended bit field is set to indicate group casting address e.g., Ford, Toyota.

Or/and if content provider address Originate/Terminate flag is set, then extended header is used to specify address of Originating content provider, (and or terminating content provider e.g., E.164 or URL). The potential use of this information is to assist the receiver application to Pull the desired information when a "buy" action is triggered in the MMI.

TBD 1.1.6 Generic Control Flags

Generic control flags are listed for MPS-Data service.

1.1.6.1 Repeat

This field may be used by the server to determine if it needs to refresh the service Queue.

If desired the receiver application may use this bit to determine if it needs to cache the content.

1.1.6.2 Activate

ASP may schedule short term pre-down load with activate flag=disabled. It may enable later. It allows the receiver system to Pull the cached information upon demand.

1.1.6.3 Receiver Alert

This flag is used to assist the receiver to use OEM defined MMI means to alert the listener. Such as OEM generated blink/flash, or audible tone.

1.1.6.4 Audio Mute

Application may set this flag to allow receiver to put main audio service in background.

1.1.6.5 CP Address

If the flag is set, X bytes in the extended header identifies:

Content Provider Originating Address

Content Provider Terminating Address 1.1.6.6 Device Type

This flag is used to assist the receiver system not to process the content if device type is installed in front panel of automotive to avoid any distraction to motorist.

1.1.6.7 Used For Future Expansion 1.2 Length

This indicates the length of the payload. This length is configurable to allow future modifications. If extended header bit is set, length is greater than burst size {MPS-Data or packet}.

1.3 Extended CPI

The use is dependent upon extended bit in CPI. This suggests that encoder header is of variable length. Possible uses of E-CPI are discussed above. It is also used for future expansion e.g., software updates, fragmentation, multiple Turbo Broadcast concatenation, Codec data rate change info, look around, broadcast system info, service addition/deletion, security management. Also see extended header field.

1.4 Datacasting Payload

Allows eight main service groups to be supported by iDatacasting and its associated ubiquitous sub types.

1.5 Filler

No filler. Bandwidth gets added in left over bandwidth at the iExciter or filler with configurable stuff.

1.6 Extended Header

This field provides a set of data for performing the functions of the IBOC services such as, but not limited to:

Authentication

Content category level

Content rating

Content type

Data service priority

Encryption modes

External service interface

Synchronization

Transactions

Markup language

Frame fragmentation and reassembly at receiver

Content security by using SDMI

Service Header Data—Service header data provides information to the receiver about the data services that exist on a channel. The fields may include, but is not limited to, Channel ID, Header size, Data Service Size, Service Count, Service Mask, Service Location.

Data Service Header—This information describes the size of the data service, as well as modes and methods of encryption and authentication. The list of fields may include but will not be limited to: Data Service Size, Data Service Priority, Encryption Mode, Encryption Bit Size, Encryption Public Key, Authentication Mode, Time Stamp, Authentication Public Key, Digital Signature Length, Digital Signature.

Data Service Data File—The data service data file is a generic data structure that characterizes a data service and carries data service content. The list of fields may include, but will not be limited to: Synchronization Cue, Sender Time Stamp, Receiver Time Stamp, Domain ID, Content Rating, Content Category Level, File Size Number, File Size Magnitude, Status Flags, Event ID, Event Indicator, Group ID, Content Type, User Data, Reserved Fields, User Defined Fields.

Synchronization Data—Synchronization data is data transmitted in relation to the audio data. The data consists of a fixed number of fixed size fields that can be used by a device to time different events. The list of fields may include, but is not limited to: Synchronization Cue, Synchronization Type, Length, Spacing, Event Transmission performance requirement of the synchronization data.

Service Mask—A service mask is information associated with a data service that characterizes the nature of the service and its functional requirements. This area of the specification defines the structure and meaning of information in the service mask.

The Turbo Broadcast Layer is protected with standard HCS and payload by well-known CRCs.

The generic encoder header provides the basic mechanism to split a larger SSAL-PDU into smaller pieces (fragmentation header) that are transmitted individually and then re-assembled at the receiver.

A specific iMAC_CPI header is defined to allow multiple iMAC frames to be concatenated. The PHY overhead and the concatenation iMAC header only occur once. Concatenation of iMAC frames is described below. Concatenation of multiple iMAC frames allows multicast addressing of receivers.

Information within the iMAC header indicates the length of the first iMAC frame and provides a length indicator to find start of the next iMAC frame. The embedded iMAC frames may be addressed to different destinations and are delivered as if they were transmitted individually. In this signaling, extended header field is disabled. The iMAC_CPI field in the Concatenation iMAC header provides a count of iMAC frames as opposed to EHDR. If the field in non-zero, then it has to indicate the total count of MAC frames (CNT) in the concatenation burst. Another function of iMAC involves mapping of SSAL-PDU over AM and FM.

As mentioned earlier, if the extended header is ON, then the length (LEN) is a 2 byte field, otherwise, it is a single byte field.

The Extended Header (EHDR) field provides extensions to the iMAC PDU format. Some of the uses of the extended header include:

Data link security using Secure Digital Music Initiative (SDMI).

Frame fragmentation and reassemble at receiver.

As explained above, data transmission from one communication system to another, via a network, requires data flow through each of the involved network layers on the source system down to the physical link where it is passed on to the peer physical layer of the respective adjacent communication system, until it is picked up by the peer layers of the destination system. Here, the data packets flow through the respective peer layers of the destination system before it is processed by software application and, for example, be viewed on a display device. The employed protocols for the data transmission implement the necessary functions of the respective layers and set forth the format by which the data is transmitted between the involved communication systems.

Figure 5B:
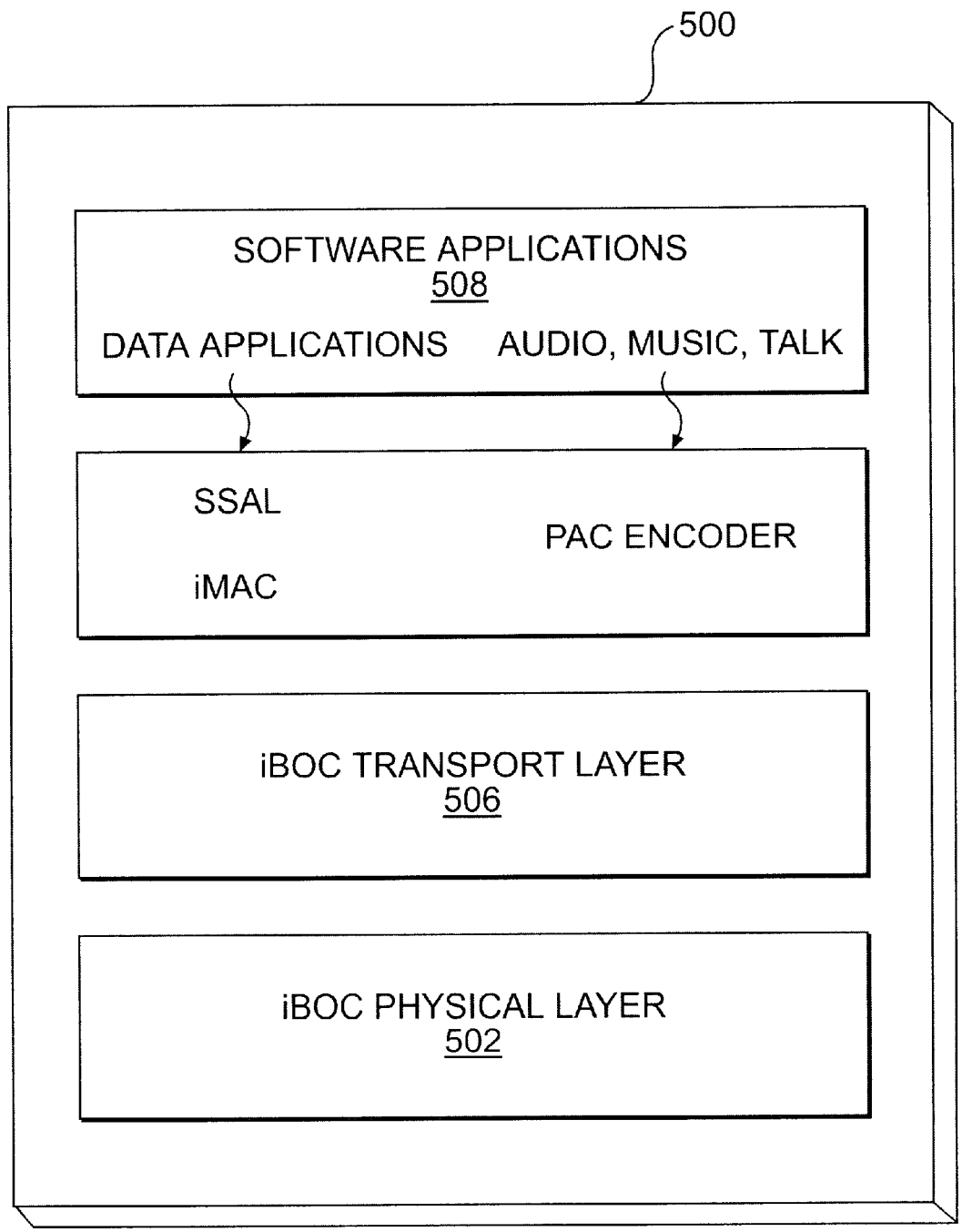

FIG. 5b illustrates a general overview of layers 500 associated with the transmission protocol used in conjunction with the receiver of the present invention. The first layer is an IBOC physical layer 502, which is followed by an iBOC transport layer 506. The next layer is the composite encoder layer with TBL 504, which is followed by a software application layer 508.

Figure 6A:
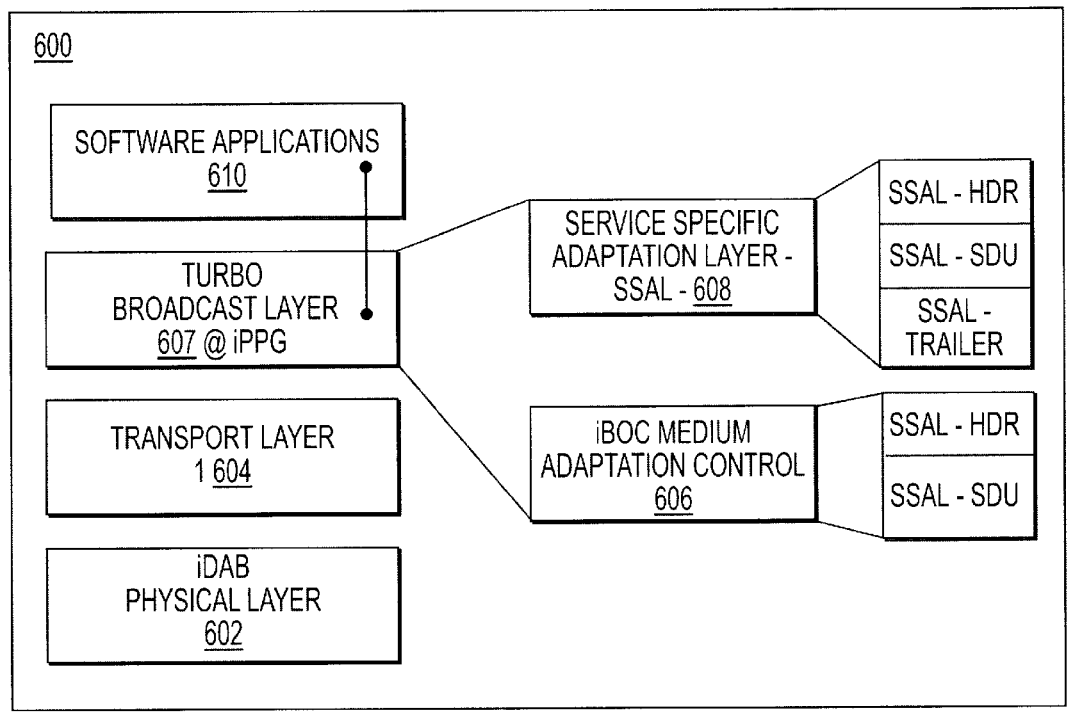
FIGS. 6a and 6b collectively illustrate the software and layer framework of a receiver (e.g., consumer electronics device) and the iPPG respectively.
Figure 6B:
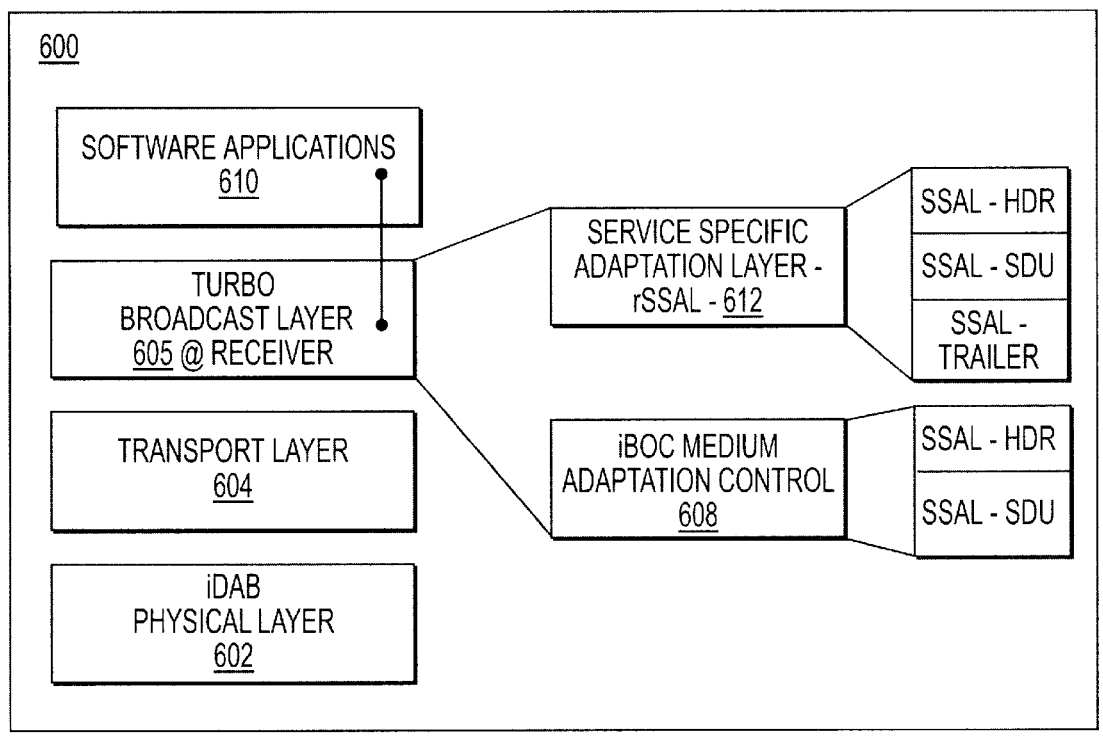

FIGS. 6a and 6b collectively illustrate the software and layer framework 600 of a mobile device (FIG. 6a) and iPPG (FIG. 6b). In general, the lowest layer is represented by the physical layer 602 where the data bit stream is synchronized and transmitted/received by a radio carrier frequency signal. On top of the physical 602 lays the transport/network stack 604. A stack is defined as a bundle of layers necessary for network communication through which all data passes at both ends of the data communication system. Transport network stack 606 is therefore responsible for the healthy data transmissions. Implemented on top of the transport layer 604 lies Turbo Broadcast Layer (TBL) 607 (SSAL 608, iMAC 606) consisting of Service Specific Adaptation Layer (SSAL 608 or rSSAL 612 in the case of the receiver's SSAL), and IBOC Medium Access Control (IMAC 606 or rIMAC 608 in the case of the receiver's IMAC).

The TBL can reside in the iPPG, if the iPPG and the iExciter are located in the same location or, the TBL can reside in the iExciter if iPPG and iExciter are connected via a microwave STL (Studio Transmitter Link).

The main functions of the TBL are: to manage upper level concatenation, file segmentation, address management, header formatting, filler, CRC generation, and BCN. Receiver side TBL on the other hand perform the following functions: defiler, TBL frame assembly, repeat discard, address read, BCN wake, and sequence delivery.

On top of stacks 605 and 607 are embedded software applications 610. The aforementioned software applications 610 are usually pre-implemented on mobile devices and the computer system deployed as iPPG when transmitting data through computer networks. TBL (612,608) 605 however, should be initialized in order to take advantage of the present invention.

The TBL SSAL 608 performs functions required by the service specific applications such as delay, loss sensitivity, jitter, or differential broadcast services such as audio, video, data, multimedia message service as defined by the content provider(s) over AM and FM.

TBL-SSAL 608 of the iPPG is responsible for the provision of QoS managed delivery of data from iPPG to consumer devices through the IBOC network by: presenting a choice of data transmission rates, minimizing the total amount of data overhead transmitted over the IBOC network, reliable and efficient delivery of downlink, alarm, and maintenance messages, anticipating and intelligently handling FEC conditions and message latency, spreading data traffic rather than incurring high burst rates, supporting terminal topologies, concepts, and protocols, as well as a portable, expendable, and flexible network hierarchy.

Some parameters are reflected in the iMAC header and intelligently used by the iExciter physical layer 602 (FIG. 6a), by placing sensitive content into non-sensitive regions of the broadcast spectrum.

TBL 605 (FIG. 6b) of the receiver implements the TBL protocol setting forth the format rules of networked communication in order to achieve TBL's 605 aforementioned functions. It should, however, be noted that existing broadcasting protocols, such as FLEX ERMES® or Pocas®, are designed for paging and because of their slow transmission speeds are not suitable for continuous broadcasting of content and graphics. Furthermore, in this scenario, the consumer devices may fail to receive some of the data packets. On the other hand, TBL protocol avoids data latency and loss of data packets by synchronizing and scheduling data broadcasts to various transmitters, and thereby maximizing the distribution link, allowing multiple transmission speeds, sophisticated error detection and correction mechanisms, pooling and scheduling available bandwidth, and repeating broadcasts.

As previously mentioned, the iPPG SSAL features a message mode and a streaming mode. The receiver's iMAC 608 (FIG. 6b) performs functions such as look-around and sequenced assembly of data packets. In the receiver-assisted look around, the receiver determines if the channel quality is bad (via a channel quality measurer) and makes a decision on which channel to pick for retrieving data, if any. Another way of look around involves iPPG assisted and directed look around. The iPPG sends a message (in its control channel) to only look for some specific broadcast frequencies. This allows for increased virtual bandwidth.

Thus, a Push operation in an in-band on-channel (IBOC) network occurs when a Push initiator (i.e., an advertiser) transmits content to an IBOC-client using Push Download Protocol (network side). However, the Push initiator shares no protocol with the IBOC client. The Push initiator is on the Internet, and the IBOC client in the IBOC domain (AM/FM radio broadcast domain). The Push initiator cannot contact the IBOC client without an intermediary, so a translating gateway is inserted. The translated gateway is referred to as the IBOC Push-Pull gateway. The radio broadcaster/operator can provide other value added services by pulling information from other sites which are of interest to its listeners such as update, traffic, financial, sports, etc.

The Push initiator contacts the Push-Pull gateway from the network side delivering content for the destination client using standard communication protocols, e.g., Transmission Control Protocol/Internet Protocol (TCP/IP). The PPG does what is necessary to forward the Pushed content to the IBOC domain, and the content is then transmitted over IBOC-bearer in the broadcast network.

Figure 7:
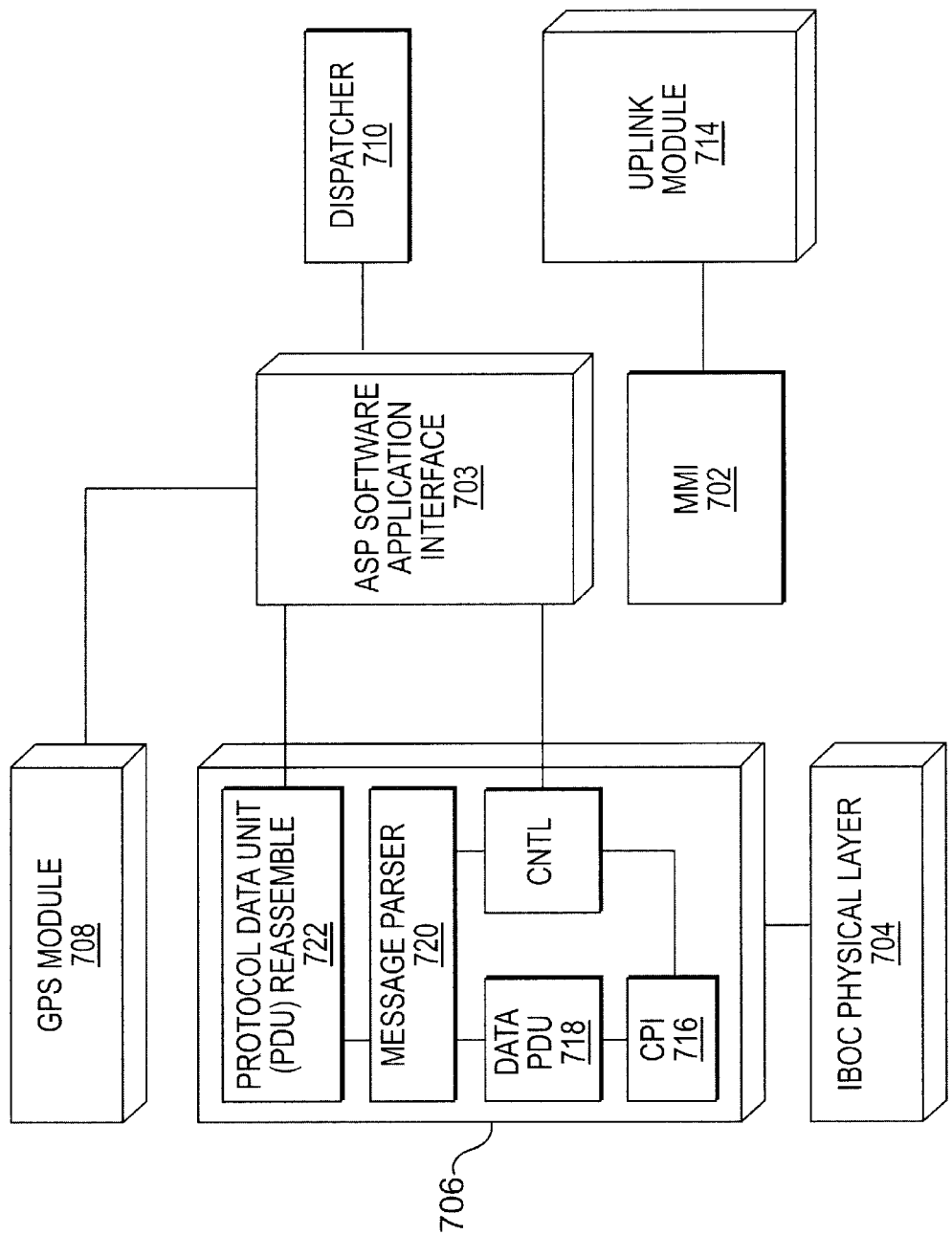
FIG. 7 illustrates in greater detail the interaction between the layers and the digital receiver of the present invention.

FIG. 7 illustrates in greater detail the interaction between the transport layers and the digital receiver of the present invention. A man machine management module 702 interacts with the software application layer 703 to extract data transmitted by the iPPG. This data is presented or cached on 702 to listener. The listener can select what services are being offered by radio station, and if he is interested in receiving those. The items of interest are communicated to TBL 706 which then directs the 704 when to wake up and get the content.

Thus, the TBL 706 uses a frame parser 716 to parse the received data for control and content 718, wherein control 716 determines the message validity. Then, a message parser 720 extracts the data PDU's from active or passive queue 722. When reassembly is complete and error free, it interacts with software 703. The ASP 703 decodes its content for MMI 702. Thus, when an ASP 703 receives pushed content, a dispatcher 710 looks at the pushed message header to determine its destination application. The dispatcher is responsible for rejecting content that does not have a suitable destination application installed and is also responsible for accepting content that is initialized by the subscriber.

Figure 8:
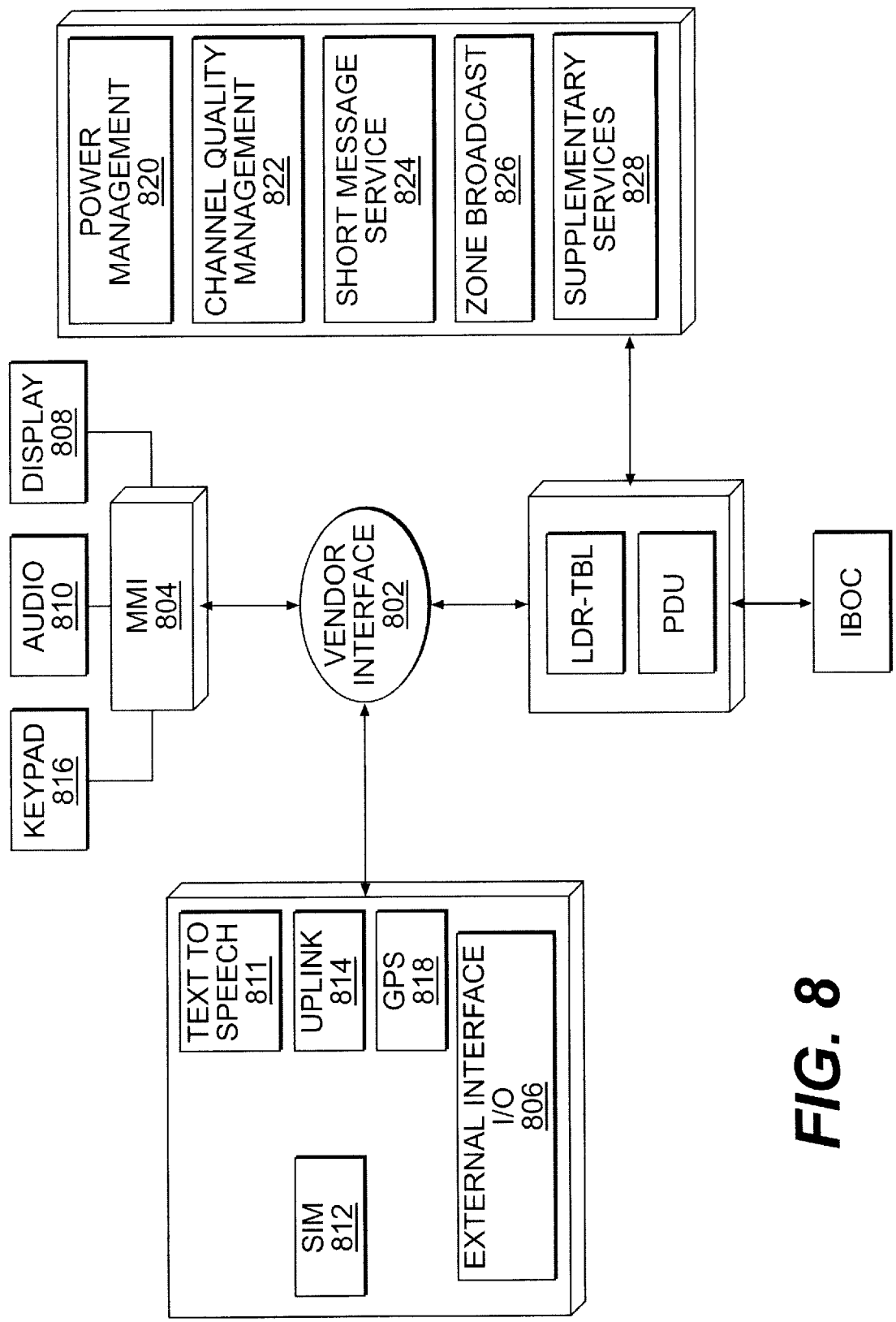
FIG. 8 illustrates a more specific instance wherein the application software layer of FIG. 7 in a vendor interface.

FIG. 8 illustrates a high end receiver system with various interfaces 802. A vendor interface 802 interacts with a MMI 804 to provide various services and management solutions. The MMI interface 804 includes a display 808, audio output mechanism 810, a keypad 816. Vendor interface 802 also communicate external interface 806 for caching of content or software upgrades, uplink 814 to communicate with iPPG or the content provider provided call center and SIM 812 for security of receiver. As described earlier, the services and management improvements include: power management 820, channel quality management 822, short message services 824, zone broadcast 826, and supplementary services 828 (to be described below).

Figure 9:
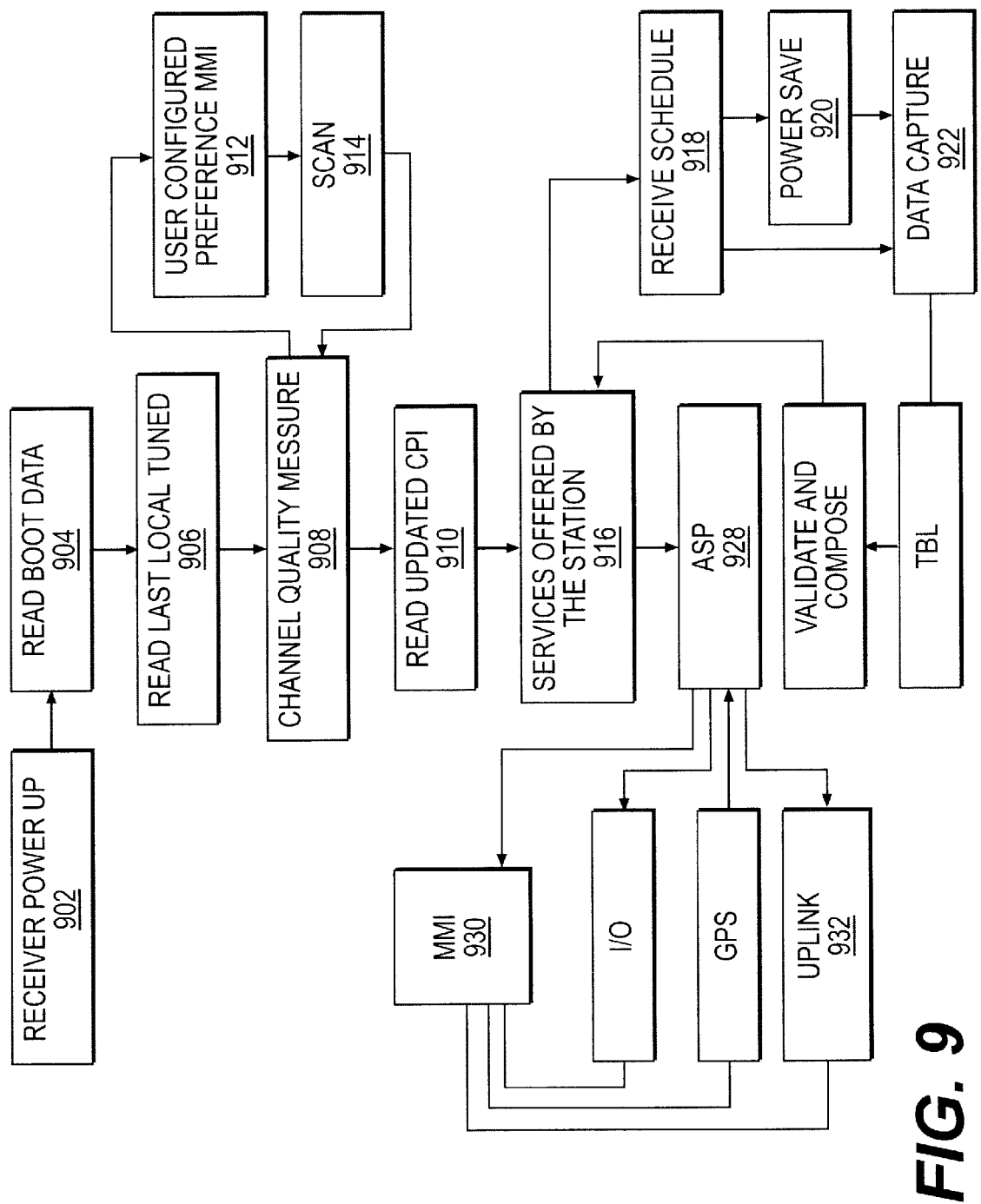
FIG. 9 illustrates the flow of data in the receiver of the present invention.

FIG. 9 illustrates the flow of data in the receiver of the present invention. First, the receiver is powered up 902, and next, boot data is read 904 in by the receiver. As a next step, the last locally tuned in channel is identified 906, and a channel quality is measured for the identified channel 908. After that, the receiver reads an updated common part indicator 910, and additionally, any user-configured preferences for the MMI are identified and loaded in the receiver 912. Then, a scan is performed for measuring the quality of the channel 914.

As a next step, the services offered by the station are captured by 916. Station offered services get cached. Using the MMI, the listener may browse and select services. These selections are initialized in the receive schedule component 918. The service scheduler may send command to power save 920. Power save can be turned on 920 in instances where information not relevant to the receiver is transmitted. Such instances can be identified by subscribers based upon the received transmit schedule. Thus, when broadcast data of interest is transmitted, the receiver captures such data 922.

Next, the ASP 928 and the receiver are able to communicate 930 and data is transferred to the receiver from the ASP 102. The MMI in the receiver utilizes the I/O, GPS, and Uplink modules to communicate 932 with the call center for further activity. The call center addressing is carried in the TBL.

As mentioned earlier, the Turbo Broadcast Layer (TBL) receiver (TBL-R) is responsible for the recombination of the blocks received via radio path to reconstitute the over-the-air (OTA) message. Additionally, the TBL is able to:

discard sequences transferred via the radio path, which do not consist of consecutive blocks store in a cache received data if transmission blocks are out of sequence and composing message at a later time when all blocks are received store partial files that are received with holes and fills in the holes as the segments are retransmitted discard data that is not in a suitable data-coding scheme discard a message that has a message identifier indicating that it is of subject matter which is not of interest to the IBOC data receiver (iDR)

ignore repeat broadcast of messages already received (if the message content has not changed since the last broadcast)

read the network directed extended channel or self-read the extended channel at a pre-determined error threshold not process data if BCN is unchanged Error-Handling in Receiver The receiver performs various error correcting functions, some of which are discussed below:

SSAL-SDU that has a length greater than SDU_Deliver_Length is discarded and the event is reported to the Layer Management.

If the value in the CPI field is not valid, any information in the reassemble buffer is discarded.

In one embodiment, a reassemble time is supported.

Make intelligent use of the reception status flags.

IMAC transmission HCS is verified. When a bad HCS is detected, the IMAC header and any payload is dropped.

Error Recovery During Fragmentation

A receiver terminates fragment reassembly if any of the following occurs:

The receiver receives a fragment with the end fragment bit set—i.e., start fragment is missed.

The receiver receives fragment, other than the first one, with continued bit set.

The receiver receives fragment with no message identifier.

Reassemble timer expiry.

Receiver Advanced Features

Some of the receivers supported features include:

The receiver follows the IREI (International Receiver Equipment Identifier) format. This is a 6-byte unique identifier burnt at time of production. The 6 bytes has a specific structure to identity, manufacturer code and unique address.

If the iDR discovers that an uplink is available, the TBL presents, to the subscribers, more choices of real-time interaction. TBL extracts ASP provided URI (uniform resource identifier or E.I64 identifier) indicating the network address. The resident application uses this information for its own use. For example, initiate uplink upon demand or later. The end-user is alerted to act upon it at a later time. Also, passive to active mode is OEM dependent and can be via Bluetooth, RS232, or proprietary serial interface (FIG. 8, 806). Additionally, an alert indication means is provided, e.g., vibrating device, tone, led flash, etc. The indication means refer to various MMI flavors to draw attention to the listener when something important is received.

The Application Dispatcher

Two ports are provisioned in the terminating device. These are secured and unsecured ports. The API dispatcher based on the application port received in the header routes the datagram. The default port is an unsecured port. When an iDR receives pushed content, a dispatcher looks at the pushed message header to determine its destination application. The dispatcher is responsible for rejecting content that does not have a suitable destination application installed, and accepting content that is initialized by the subscriber.

Receiver Classes

Based upon features, the OEM defines several classes of receivers such as:

Class C—Audio only: Receiver with minimum buffering and CPU requirement—Only program associated info and low bit rate sequenced delivery may be supported.

Class B—Data Only: Receiver with buffering—The receiver is part of portable/fixed unit or a standalone device Class A—Multimedia: Audio and Data together SIM interfaces with Class A, B, and C Uplink capability with Class A, B, and C More than one receiver with Class A, B, and C MMI Related to IBOC Receiver Features It is up to the application developer to determine how the content is displayed on the terminating devices for various manufacturers. The physical means to perform MMI functions are a keypad, voice input device, DTE, etc. The minimum external inputs are given below in Table 2:

TABLE 2

| Scroll | Program Features |
|---|---|
| Save | Text to Speech |
| Clear | Speech to Command |
| One Touch | End |
| (Buy) | |
| | On demand view |

Scroll

This MMI function is used to scroll the receiver-cached buffer. Possible sub functions are scroll up/down or right to left. The receiver may implement these functions locally or it may be iPPG directed.

Save

This MMI function is used to store the contents. A user may press the button to store the contents being transmitted. A play store feature is suggested, that is, if contents are played, they get stored in a circular buffer. If listener decides to store the song or other contents, the contents are picked up from the circular buffer to another storage location.

Clear

This function is used top clean up circular buffer and current display.

One Touch

This graphical use function is used to store listener profile such as its name, address, and credit card information, billing information, contact number. This function is password protected. The purpose of this function is to provide, upon demand, a one-touch access to call center (when connected via uplink). This is used for active buy.

Program Features

This function is used to display station information services and schedule. This allows the listener to initialize services of interest and instruct the receiver when to get turned on and off. This also instructs the receiver to hop to the next station if the current radio station is not supporting services of interest.

Text to Speech

If text to speech device is installed in the receiver, the receiver uses this function to convert the text to speech. This feature is useful to motorists.

Speech to Command

If Speech to Command device is installed, the listener may guide the receiver via speech as opposed to keypad. This feature is also useful to motorists.

End

This function is used to gracefully tear down interaction between the receiver and the listener, and/or listener and call center.

On Demand View

The pushed contents are not made available until asked.

Program User Agent Profile

Setting of filters as desired by the subscriber, for example:

Selection of language, perks, etc.

Supervisory tones (Alert Mechanism).

IBOC Receiver Activation

The IBOC receiver activation procedure is comprised of the initial actions the user has to take before data can be received. This procedure includes, for example, insertion of a subscriber flash card in a personal digital assistant (PDA) and entering the PIN-code.

When the IBOC receiver is switched on or in the case of a plug-in SIM, an indication is given to the user that PIN must be entered, unless the PIN is not applicable. As described by the OEM as indication is given to the user showing whether this procedure was successful. It should be noted that these functions are local to the receiver.

Supplementary Functions

The following functions are applicable for receiver terminated and OneTouch originated invocation of any supplementary services:

ACCEPT: Acceptance of a terminated message

SELECT: Entry of information such as a voice command.

OneTouch: Transmission of preentered subscriber information to the network. The information may be prestored.

END: Termination of or disconnection from the message. The execution of the END-function may be caused by either party involved, for example, operator termination, loss of coverage, invalidation of payment, user MMI action, etc.

Voice Activation Initiation

If interface exists, protocol may allow text to speech conversion. This has to be turned on by the application.

Supplementary Services

Passive to Active

If a buy button is pressed, a trigger message is sent to TBL receiver. Using open programming interface the TBL receiver extracts dial-out number in the form of MS-ISDN, or alternatively a URL link is given to the uplink device. Upon connect, the device indicates that an uplink connection has been established and standard e-commerce or application-defined procedures can then be used. One touch key provides all the prestored information (or this could be interactive).

Connection-Oriented Push

A connection-oriented Push requires an active session. The fundamental assumption is that the device has an uplink capability and a subscriber wishes to initiate a session. This event may occur if a client is interested in pushed content and would like to initiate further activity. Therefore, client is to send a session request to a special application in the client known as the Session Initiation Activation (SIA). The SIA retrieves hyperlink, or E.I64 information from the PUSH. The address could be iGateway, Broadcaster, manufacturer server, a call center, etc. Other means of SIA are also provisioned, where client may like to create a session later. This assumes that session may be established when passive content is stored and later retrieved for establishing a connection.

Furthermore, the present invention includes a computer program code based product, which is a storage medium having program code stored therein, which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory, or data storage devices.

Implemented in computer program code based products are software modules for: receiving one or more pushed broadcast data content, decoding the broadcast data content based upon one or more previously assigned private keys, parsing said content for control related information, parsing said content to extract data content based upon said parsed control related information, identifying a client device from one or more client devices for which said extracted data content is to be routed, formatting said extracted data content in a specific format associated with said identified client device, and rendering said formatted data content in said identified client device. The above enhancements for icons and its described functional elements are implemented in various computing environments. For example, the present invention may be implemented across a multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of network communications, mark-up language, and protocol programming.

A system and method has been shown in the above embodiments for the effective implementation of a system and method for providing a Push-Pull Gateway between mobile devices and remote content provider centers. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware, choice of communication protocols, number of transmitters, number or receivers, and number of Push/Pull gateways used.

I claim:

1. A receiver for receiving digital broadcast data content, said data content sent from a Push-Pull gateway via a network, said receiver comprising:
   a. a receiving unit receiving pushed broadcast data content, said data content broadcast based upon a predetermined schedule;
   b. a decoder decoding said broadcast data content based upon one or more previously assigned private keys;
   c. a first parser parsing said content for frame related information;
   d. a second parser parsing said content to extract data content based upon said parsed frame related information;
   e. a dispatcher identifying a client device from one or more client devices for which said extracted data content is to be routed;
   f. a formatter formatting said extracted data content in a specific format associated with said identified client device, and
   g. a content renderer rendering said formatted data content in said identified client device, and
   h. an uplink for communicating with said Push-Pull gateway.

2. A receiver for receiving digital broadcast data content, said data content sent from a Push-Pull gateway via a network, according to claim 1, wherein said network is an in-band on-channel (IBOC) network.

3. A receiver for receiving digital broadcast data content, said data content sent from a Push-Pull gateway via a network, according to claim 1, wherein proper reception of audio content requires at least a class C receiver, and proper reception of data content requires at least a class B receiver, and proper reception of audio data content requires a class A receiver.

4. A receiver for receiving digital broadcast data content, said data content sent from a Push-Pull gateway via a network, according to claim 1, wherein said receiver is a consumer electronics receiver.

5. A receiver for receiving digital broadcast data content, said data content sent from a Push-Pull gateway via a network, according to claim 1, wherein said receiver further comprises a global positioning system (GPS) identifying a coordinate location associated with said receiver, wherein said coordinate location is transmitted to said Push-Pull gateway via said uplink.

6. A receiver for receiving digital broadcast data content, said data content sent from a Push-Pull gateway via a network, according to claim 1, wherein said uplink is used to update profiles associated with one or more clients, said profiles stored in said Push-Pull gateway.

7. A receiver for receiving digital broadcast data content, said data content sent from a Push-Pull gateway via a network, according to claim 6, wherein said profiles are used to dynamically update said one or more private keys.

8. A receiver for receiving digital broadcast data content, said data content sent from a Push-Pull gateway via a network, according to claim 6, wherein said profiles define one or more desired broadcast formats associated with said one or more clients.

9. A receiver for receiving digital broadcast data content, said data content sent from a Push-Pull gateway via a network, according to claim 1, wherein said receiving unit further comprises:
   a. an antenna for receiving said digital broadcast data content;
   b. a channel quality measurer for measuring a channel quality associated with one or more receiving channels, and
   c. an amplifier for amplifying said received content based upon said measured channel quality.

10. A receiver for receiving digital broadcast data content, said data content sent from a Push-Pull gateway via a network, according to claim 1, wherein said decoder is a turbo broadcast decoder.

11. A receiver for receiving digital broadcast data content, said data content sent from a Push-Pull gateway via a network, according to claim 1, wherein said receiver further comprises a battery save module for disabling said receiver during idle time or disabling said receiver during non-transmission times, said non-transmission times identified from said predetermined schedule.

12. A receiver for receiving digital broadcast data content, said data content sent from a Push-Pull gateway via a network, according to claim 11, wherein said receiver further comprises a wakeup module for enabling receiver during transmission times as identified by said predetermined schedule.

13. A receiver for receiving digital broadcast data content, said data content sent from a Push-Pull gateway via a network, according to claim 1, wherein said receiver further comprises a local memory for temporarily storing said received pushed broadcast content.

14. A method for receiving digital broadcast data content, said data content sent from a Push-Pull gateway via a network, said method comprising:
   a. receiving pushed broadcast data content, said content broadcast based upon a predetermined schedule;

b. decoding said broadcast data content based upon one or more previously assigned private keys;

c. parsing said content for frame related information;

d. parsing said content to extract data content based upon said parsed frame related information;

e. identifying a client device from one or more client devices for which said extracted data content is to be routed;

f. formatting said extracted data content in a specific format associated with said identified client device, and g. rendering said formatted data content in said identified client device, and h. communicating with said Push-Pull gateway via an uplink.

15. A method for receiving digital broadcast data content, said data content sent from a Push-Pull gateway via a network, according to claim 14, wherein said network is an in-band on-channel (IBOC) network.

16. A method for receiving digital broadcast data content, said data content sent from a Push-Pull gateway via a network, according to claim 15, wherein said rendered data is in digital audio broadcasting format suitable for reception via a consumer electronics receiver.

17. A method for receiving digital broadcast data content, said data content sent from a Push-Pull gateway via a network, according to claim 14, wherein said method further comprises the step of communicating a coordinate location of said receiver to said Push-Pull gateway.

18. A method for receiving digital broadcast data content, said data content sent from a Push-Pull gateway via a network, according to claim 14, wherein said method further comprises transmitting profile information associated with one or more clients, wherein said profiles are stored in said Push-Pull gateway.

19. A method for receiving digital broadcast data content, said data content sent from a Push-Pull gateway via a network, according to claim 14, wherein said method further comprises dynamically updating said one or more private keys based upon said transmitted profile information.

20. A method for receiving digital broadcast data content, said data content sent from a Push-Pull gateway via a network, according to claim 14, wherein said method further comprises:

a. measuring a channel quality associated with one or more receiving channels, and b. amplifying said received content based upon said measured channel quality.

21. A method for receiving digital broadcast data content, said data content sent from a Push-Pull gateway via a network, according to claim 14, wherein said method further comprises disabling said receiver during idle time or disabling said receiver during non-transmission times, said non-transmission times identified from said predetermined schedule.

22. A method for receiving digital broadcast data content, said data content sent from a Push-Pull gateway via a network, according to claim 21, wherein said method further comprises enabling receiver during transmission times as identified by said predetermined schedule.

23. A method for receiving digital broadcast data content, said data content sent from a Push-Pull gateway via a network, according to claim 14, wherein said method further comprises temporarily storing said received pushed broadcast content in a local memory.

24. A method for receiving digital broadcast data content, said data content sent from a Push-Pull gateway via a network, according to claim 14, wherein said receiver is a consumer electronics receiver.

25. An article of manufacture comprising a computer usable medium having a computer readable program code embodied therein that controls receiving digital broadcast data content, said data content sent from a Push-Pull gateway via a network, said article comprising:

a. computer readable program code receiving pushed broadcast data content, said content broadcast based upon a predetermined schedule;

b. computer readable program code decoding said broadcast data content based upon one or more previously assigned private keys;

c. computer readable program code parsing said content for frame related information;

d. computer readable program code parsing said content to extract data content based upon said parsed frame related information;

e. computer readable program code identifying a client device from one or more client devices for which said extracted data content is to be routed;

f. computer readable program code formatting said extracted data content in a specific format associated with said identified client device, and g. computer readable program code rendering said formatted data content in said identified client device, and h. computer readable program code communicating with said Push-Pull gateway via an uplink.

26. An article of manufacture comprising a computer usable medium having a computer readable program code embodied therein that receives digital broadcast data content, said data content sent from a Push-Pull gateway via a network, according to claim 25, wherein said network is an in-band on-channel (IBOC) network.

* * * * *